United States Patent [19]
Reynolds

[11] 4,183,455
[45] Jan. 15, 1980

[54] LANCED TUBE JOINT PROCESS

[75] Inventor: William D. Reynolds, Morrison, Tenn.

[73] Assignee: Carrier Corporation, Syracuse, N.Y.

[21] Appl. No.: 862,717

[22] Filed: Dec. 21, 1977

[51] Int. Cl.² ............................................. B23K 31/02
[52] U.S. Cl. .................................................. 228/170
[58] Field of Search ................. 228/170; 285/189, 287

[56] References Cited
U.S. PATENT DOCUMENTS

| 2,261,774 | 11/1941 | Miller | 285/189 X |
| 2,665,147 | 1/1954 | Wiesmann | 285/189 X |
| 3,508,770 | 4/1970 | Cassel | 285/189 |
| 4,074,848 | 2/1978 | Groh et al. | 228/173 C |

Primary Examiner—Francis S. Husar
Assistant Examiner—K. J. Ramsey
Attorney, Agent, or Firm—J. Raymond Curtin; Robert P. Hayter

[57] ABSTRACT

A method of and apparatus for joining a small diameter tube to a large diameter tube. An indentation tool is used to inwardly deform the wall of a tube from the outside into the internal bore of the tube. The resulting indentation formed has an open end sized to receive the small diameter tube. The small diameter tube is then located within the indentation and mechanically joined by brazing or soldering such that the axis of the portion of the small diameter tube within the large diameter tube is roughly parallel to the axis of the large diameter tube.

7 Claims, 3 Drawing Figures

LANCED TUBE JOINT PROCESS

BACKGROUND OF THE INVENTION

1. Field of the Invention

The present invention relates to joining two tubes together. The invention specifically relates to joining a small diameter tube to a large diameter tube, such that fluid flow from the small diameter tube may enter the large diameter tube without creating undue turbulence. More specifically, the present invention relates to a pipe joint for use in air conditioning equipment wherein small diameter tubes are joined to large diameter tubes.

2. Description of the Prior Art

In air conditioning and refrigeration equipment it is common to join a small diameter tube such as the capillary tube to a large diameter tube, often a header. The different size tube joints can be found both in the condenser coil and the evaporator coil of a standard refrigeration unit. Another use of a joint between a large diameter tube and a small diameter tube can be found in a heat pump. See Patent Application entitled "Heat Pump System", Ser. No. 720,721, assigned to the assignee hereof wherein a small diameter tube is joined to a large diameter tube to aid in the routing of the refrigerant through the coil depending on whether the coil is used as the evaporator or the condenser of the heat pump.

Prior to the disclosed joint herein it was common to merely form a T-joint wherein the small diameter tube is simply connected to the large diameter tube at right angles. Other types of joints have been utilized wherein the surface of the large diameter tube has been formed outwardly to provide a collar for joining a small diameter tube. Another method of joining small diameter tubes to large diameter tubes is shown in U.S. Pat. No. 2,261,774 entitled "Lubricant Atomizer," wherein the small diameter tube is screwed into the threaded wall of the large diameter tube.

Previous joints have required the use of either the complex screw threads as shown in the U.S. Pat. No. 2,261,774 patent or weak solder arrangements wherein the surfaces of the large and small diameter tubes are joined externally from the large diameter tube. Furthermore the T-joint previously used creates considerable turbulence with the internal flow of the large diameter tube. The fluid flowing through the small diameter tube enters the large diameter tube at right angles creating fluid flow discontinuities. These previous joining efforts further require the drilling of a hole and removal of chips and other machining operations.

The present invention provides for a simple indentation tool to deform a portion of the surface of the tube so that an opening is provided wherein the small diameter tube may be inserted. This opening with the tube in place is then materially joined to form the joint. No screw threads or complicated machining equipment is required. Furthermore the small diameter tube within the opening is directed such that the fluid flow therefrom is parallel to the fluid flow in the large diameter tube.

SUMMARY OF THE INVENTION

An object of the invention is to join a small diameter tube to a large diameter tube.

A more specific object of the present invention is to join a small diameter tube to a large diameter tube without the use of complex machining equipment.

A further object of the present invention is to provide a joint between a small diameter tube and a large diameter tube wherein the joint is so arranged that fluid flow through the small diameter tube is discharged within the large diameter tube parallel to the flow therein.

Another object of the present invention is to provide a strong, reliable and inexpensive mechanical joining method to join the small diameter tube to the large diameter tube.

Other objects will be apparent from the description to follow and from the appended claims.

The preceding objects are achieved according to the preferred embodiment of the invention by deforming a portion of the wall of the large diameter tube with an indentation tool such that the indented portion is partially broken away from the tube wall forming an opening at the end thereof. This indented portion is angled such that the small diameter tube may be inserted through the opening into the large diameter tube. The portion of the small diameter tube within the large diameter tube has its axis parallel to the axis of the large diameter tube such that the fluid flow in both is substantially parallel. The deformed portion of the wall is angled such that the fluid flow in the large diameter tube meets an inclined surface rather than an abrupt surface which would be the case with a right angle joint. After the insertion of the small diameter tube through the opening, the indentation area is mechanically joined by soldering or brazing to provide a fluid tight joint between the large diameter tube and the small diameter tube.

DESCRIPTION OF THE PREFERRED EMBODIMENT

The embodiment of the invention described below is adapted for use in air conditioning equipment for joining a small diameter tube to a large diameter tube. It is understood that this invention has like applicability in other fields where small diameter tubes are joined to large diameter tubes. The invention also applies to pipes, conduits and other annular shaped articles having fluid flow therein. This particular pipe joint method may be utilized in various parts of a refrigeration circuit and in various fluid flow directions.

Figure 1:
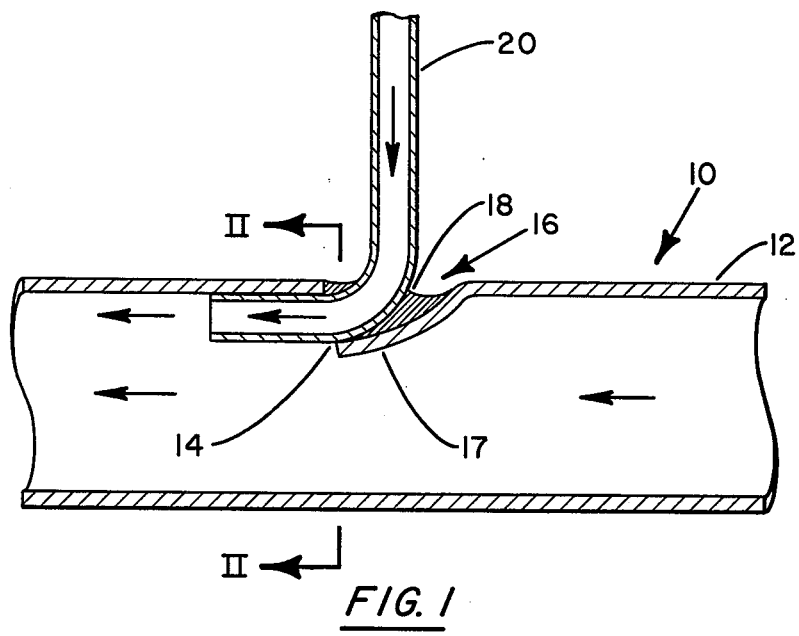
FIG. 1 is a cut-away sectional view of a small diameter tube soldered into the large diameter tube using the pipe joint as described herein.

Referring now to the drawings, FIG. 1 shows a cut-away sectional view of the small diameter tube soldered to the large diameter tube. Large diameter tube 10 has tube walls 12 in which an indentation 16 is formed. The deformed portion of the wall 17 is depressed inwardly from the normal position of the tube wall. The space between the outer surface of the deformed portion of the wall 17 and the non-deformed wall 10 is denoted as opening 14. Small diameter tube 20 is bent at a right angle in FIG. 1 and has a portion thereof extending through opening 14 such that the axis of the portion of the small diameter tube within the large diameter tube is approximately parallel to the axis of the large diameter tube 10. Solder 18 (any suitable bonding material such as brazing alloy or even adhesive would suffice) is shown within indentation 16 bonding small diameter tube 20 to the large diameter tube 10.

Figure 2:
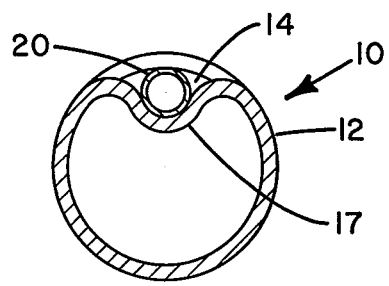
FIG. 2 is a cross-sectional view of FIG. 1 taken at line II—II.
Figure 3:
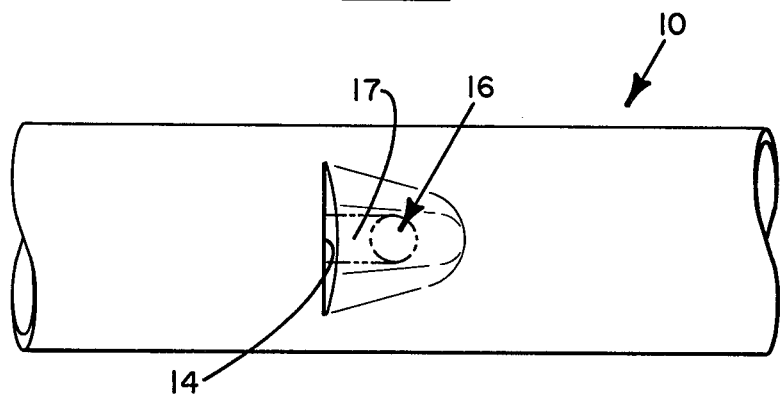
FIG. 3 is a top view of the large diameter pipe showing the indentation therein.

In FIG. 2, a cross-sectional view of FIG. 1 taken at line II—II, it can be seen that tube wall 12 of tube 10 is partially deformed portion of wall 17, such that opening 14 is provided into which small diameter tube 20 is inserted. The indentation 16 and deformed portion of wall 17 are more particularly shown in FIG. 3, a top view of the large diameter tube 10 without the small diameter tube being inserted. Opening 14 is also shown therein.

The pipe joint as described herein may utilize a small diameter tube which is bent at various angles. The angle to which the small diameter tube is bent is dependent upon the location of the components to be connected. It is obvious from the drawings and description that the small diameter tube will usually be bent in order to fit through the opening and around the pipe surface. Solder 18 as designated in the drawings bonds the small diameter tube to the large diameter tube, but brazing, welding or even adhesively affixing the two tubes together will accomplish the same purpose.

In order to form this indentation 16 within the large diameter tube an indenting tool is utilized. The indenting tool is placed adjacent the exterior surface of the tube wall and then forceably moved inward such that the tube wall is deformed creating an opening 14. This inward movement of the indenting tool is angled such that the deformed portion of the wall 17 is inclined from the non-deformed portion of tube wall 12. After the indentation has been created the small diameter tube is inserted through the opening and subsequently affixed in place. The indentation tool may be as simple as a cylindrical rod being struck by a hammer such that a portion of the wall shears creating the appropriate deformed portion of wall 17. A solid rod may be inserted within large diameter tube 10 adjacent the area to be deformed to prevent the tube wall adjacent thereto from being deformed and consequently promoting the shearing between the tube wall 12 and the deformed portion of wall 17.

The invention has been described in detail with particular reference to preferred embodiment thereof, but it will be understood that variations and modifications can be affected within the spirit and the scope of the invention.

I claim:

1. A method of joining a small diameter tube to a large diameter tube which comprises the steps of:
    forming an indentation in the wall of the large diameter tube such that a portion of the wall is sheared from the remainder of the tube wall leaving an indentation portion inclined inwardly toward the axis of the large diameter tube and leading to an opening through the wall, said opening being defined by the indentation portion of the wall and the remaining nondeformed wall, said indentation portion being angled such that the fluid flow in the large diameter tube impinges the indented portion of the tube wall away from the opening and is forced inwardly and around said opening by the indentation portion;
    inserting the small diameter tube through the opening in the wall such that the portion of the small diameter tube extending through the opening discharges fluid flowing therethrough in a direction generally parallel to the axis of the large diameter tube; and
    affixing the small diameter tube to the large diameter tube.

2. The invention as set forth in claim 1 wherein the step of forming an indentation includes:
    placing an indenting tool along the exterior surface of the large diameter tube; and
    applying a force to said tool such that a portion of the wall is deformed inwardly from the remaining tube wall leaving an opening adapted to receive the small diameter tube.

3. The invention as set forth in claim 2 wherein the step of inserting the small diameter tube includes the small tube being angled such that the axis of the portion of the small diameter tube inserted into the large diameter tube is roughly parallel to the axis of the large diameter tube.

4. The invention as set forth in claim 1 wherein the step of securing the small diameter tube to the large diameter tube comprises soldering the tubes to each other at the indentation to form a joint.

5. A method of joining a small diameter tube to a large diameter tube such that fluid flow from the small diameter tube may be discharged into the large diameter tube with a minimum of turbulence which comprises the steps of:
    forming an indentation portion in the wall of the large diameter tube, said indentation portion commencing in the tube wall and being angled inwardly to an opening created by deforming a portion of the tube wall during the step of forming, said opening being defined by the indentation portion and the tube wall not deformed and said opening being adapted to receive the small diameter tube with said indentation portion being oriented so that fluid flow in the large diameter tube impinges the indented portion of the tube wall away from the opening and is forced inwardly and around said opening by the indentation portion;
    inserting the small diameter tube into the opening at the end of the indentation portion such that a portion of the small diameter tube extending into the large diameter tube has its axis substantially parallel with the axis of the large diameter tube such that fluid being discharged from the small diameter tube into the large diameter tube is discharged in substantially parallel flow with the flow in the large diameter tube; and
    affixing the small diameter tube to the large diameter tube.

6. The invention as set forth in claim 5 wherein the step of forming an angled indentation includes:
    placing an indenting tool adjacent to the exterior surface of the tube; and
    applying a force to said tool to form the indentation.

7. The invention as set forth in claim 5 wherein the step of affixing includes soldering the small diameter tube to the large diameter tube to form a fluid tight joint.

* * * * *